Figure 1:
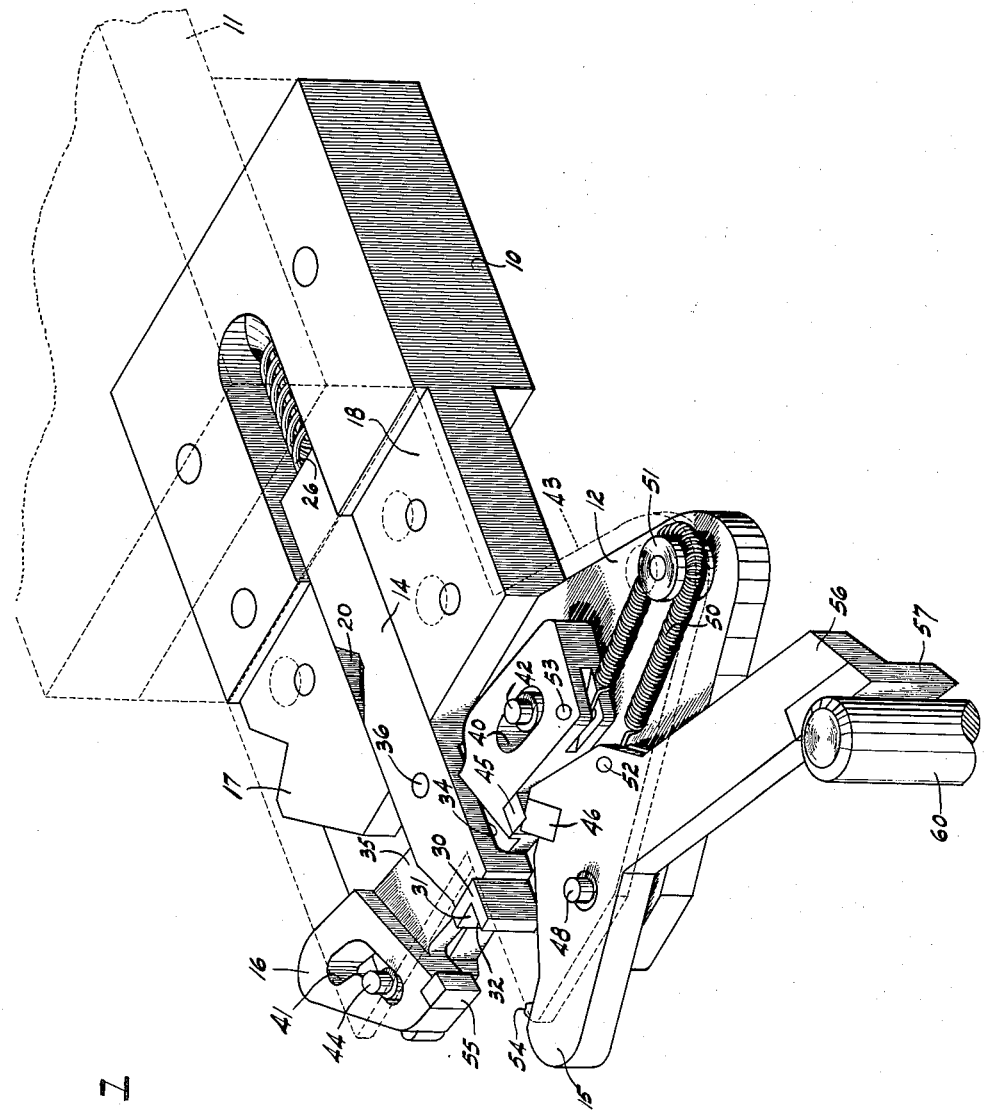

Feb. 28, 1961

G. E. ALGATT ET AL 2,973,197

ARTICLE GRIPPING CHUCK

Filed May 31, 1957

3 Sheets-Sheet 1

Inventors
G.E. ALGATT
H.T. CAMPBELL
E.W. NELSON
By W.A. Johnson
A. Horney
Attorney

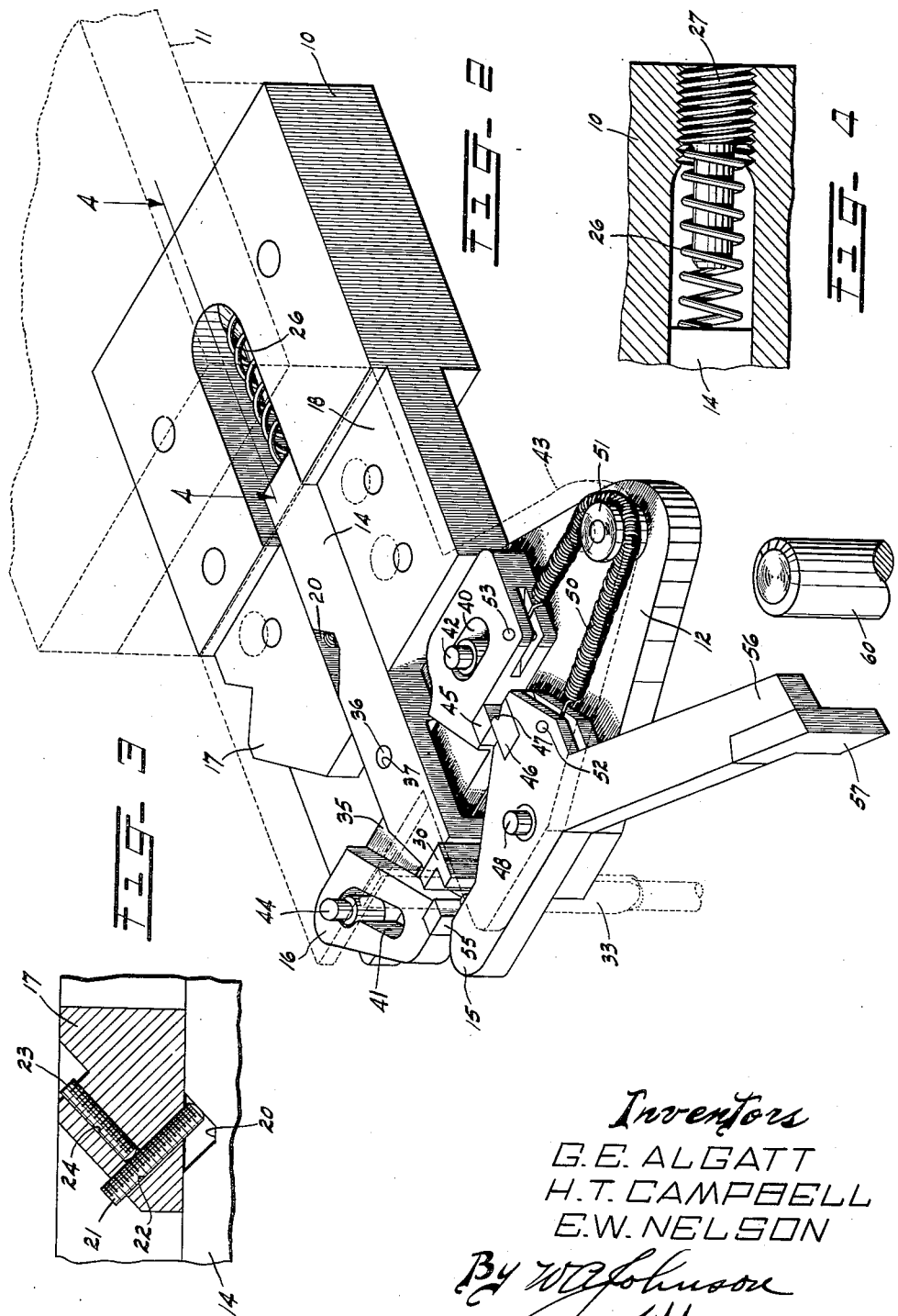

Feb. 28, 1961

G. E. ALGATT ET AL 2,973,197

ARTICLE GRIPPING CHUCK

Filed May 31, 1957

3 Sheets-Sheet 3

Inventors
G. E. ALGATT
H. T. CAMPBELL
E. W. NELSON
By W. A. Johnson
A. Horney

United States Patent Office 2,973,197
Patented Feb. 28, 1961

2,973,197
ARTICLE GRIPPING CHUCK
George E. Algatt, Hobart T. Campbell, and Eric W. Nelson, Allentown, Pa., assignors to Western Electric Company, Incorporated, New York, N.Y., a corporation of New York Filed May 31, 1957, Ser. No. 662,751
8 Claims. (Cl. 269—190)

This invention relates to article gripping chucks particularly chucks for the assembly of articles in turret type machines.

Chucks of the type disclosed in the co-pending application of R. F. Brewer and J. A. Hosford Serial Number 505,172, filed May 2, 1955, employ a plurality of radially positioned groups of arms movable intermittently about an axis of a turret, each group of arms carrying upper and lower chucks for upper and lower reeds to be positioned in a glass tube held by an intermediate chuck to make three-piece dry reed switches. The metal reeds for the switches are fed intermittently to their respective receiving positions in their receiving areas and held stationary at these positions while their respective chucks are moved intermittently to receive, grip and carry the reeds through the operating cycle of the machine during which time the switches are completed.

The important features essential for intermittently movable chucks are to position the elements of the chuck, which are to engage the article or reed, in open positions free of engagement with the article while moving into the receiving area in alignment with the article, after which the elements are required to function rapidly and in a particular order to engage the article and locate it accurately for assembly. Furthermore, these actions must take place during the interval of movement of the chuck with its respective arm so that when the arm and chuck come to rest the chuck will have been operated to receive, locate and grip the article.

The object of the present invention is a chuck which is readily actuable and highly efficient in receiving, orienting and holding articles for assembly.

In accordance with the object, the invention comprises a chuck adapted particularly for gripping an article fed to and temporarily held in a receiving area and including a locating element having an article engaging end mounted for movement from an open position, with the article engaging end spaced from the receiving area, to a locating position in the receiving area, and a clamping element having an article engaging member mounted for movement from an open position with the article engaging member spaced from the receiving area, and a clamping position in the receiving area, the clamping element being actuable to actuate the locating element and, when released, to permit the elements to locate and clamp the article.

In actual structure the locating element has L-shaped surfaces to engage predetermined surfaces of the article while two clamping elements operate in conjunction with the locating element to force the respective surfaces of the article against the surfaces of the locating element. Furthermore, the elements are operatively connected by companion engaging members so that the actuation of one element will cause actuation of all three elements in a given order.

Figure 5:
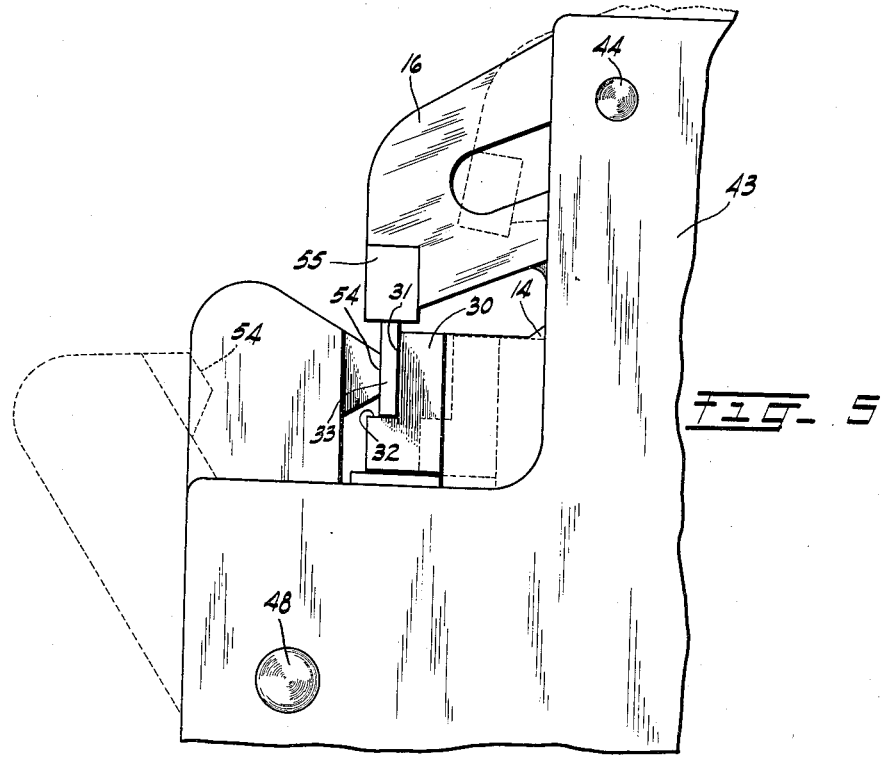
Figure 6:
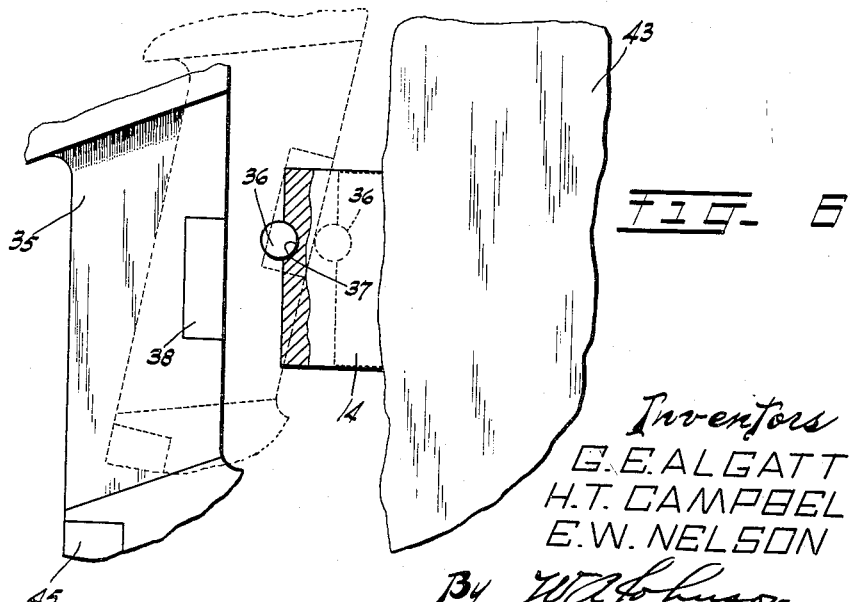

Other objects and advantages will be apparent from the following detailed description when considered in conjunction with the accompanying drawings wherein:

Fig. 1 is an isometric view of the chuck shown in open position;
Fig. 2 is an isometric view of a chuck shown in closed position;
Fig. 3 is a fragmentary sectional view of a portion of the chuck illustrating the adjusting means for the locating element;
Fig. 4 is a fragmentary sectional view taken substantially along the line 4—4 of Fig. 2;
Fig. 5 is an enlarged fragmentary top plan view of a portion of the chuck, and
Fig. 6 is a fragmentary top plan view of portions of the chuck illustrating the operative connection between one of the clamping elements and the locating element.

The chuck includes a body 10 fixedly mounted on the outer end of an arm 11 of a turret type machine which may be of the type shown in the aforementioned co-pending application. In the present instance, the arm 11 is in a horizontal plane with two other arms (not shown) positioned in parallel planes therebeneath to form a group of arms with chucks fixed to their outer ends to receive, from top to bottom, the upper reed, the glass tube and the lower reed. There are 18 radially positioned groups of arms in the machine of the co-pending application, the chucks of each to receive their parts in a receiving area during movement of the arms about the axis of the machine. The only other movements of the arms in each group are relative vertical movements to position the reeds in the glass tube. The body 10 is of the contour shown in Figs. 1 and 2 having a supporting surface 12 lying in a given plane to support a locating element 14 for sliding movement thereon, a gripping element 15 for pivotal movement thereon and a gripping element 16 for sliding and pivotal movement thereon. The body 10 has thicker portions 17 and 18 extending above the plane of surface 12 and spaced from each other to serve as parallel guides for the locating element 14 in moving on the surface 12 from its open position shown in Fig. 1 to its closed position shown in Fig. 2. The locating element 14 has a notch 20 cut in one side thereof to receive an adjustable screw 21 which acts as a stop for the element. The screw 21 is adjustable in a threaded aperture 22 of the portion 17 and a set screw 23 disposed in a threaded aperture 24 at right angles to the aperture 22 serves to lock the adjusting screw 21 in any desired position. A spring 26 carried by an adjustable threaded member 27, Fig. 4, engages the back end of the locating element 14 to apply sufficient force to the element to move it into its closed or locating position. The front end of the locating element 14 has an L-shaped member 30 formed of suitable wear resistant material and provided with locating surfaces 31 and 32 to be engaged by particular surfaces of an article 33, Figs. 2 and 5. In the present instance, the article 33 is a metal member with flat surfaces and is known as a reed for a three-piece dry reed switch. The locating element 14 has its under portion cut away at 34 to provide a recess for the central reduced portion 35 of the clamping element 16. The recess 34 is of sufficient size to allow movement of the reduced portion 35 therein. A pin 36 fills an aperture 37, in the element 14, which opens into the recess 34 to expose half of the circumference of the pin in the recess 34 for engagement with an insert 38 of wear resistant material in the central portion 35 of the clamping element 16 as illustrated in Fig. 6.

The clamping element 16 has an elongated aperture 40 disposed in one end thereof and a substantially L-shaped elongated aperture 41 in the other end thereof. The aperture 40 receives a pin 42, the reduced ends of which are firmly held in apertures, one of which is disposed in the body 10 while the other is disposed in a cover plate 43 shown in dotted lines in Figures 1 and 2, and in solid lines in Fig. 5. The cover plate 43 is shown in dotted lines in Figs. 1 and 2 to reveal the structures there beneath. Another pin 44, identical to pin 42 and similarly mounted, has its larger portion disposed in the aperture 41. A block 45 of wear resistant material is fixed to the clamping element 16 for engagement with a similar block 46 of wear resistant material fixed to the clamping element 15. The block 46 is notched at 47 to receive a corner of the block 45 when the elements are in their open positions Fig. 1.

The clamping element 15 is pivotally mounted on a pin 48 the reduced ends of which are disposed in aligned apertures in the body 10 and the cover 43. The clamping elements 15 and 16 are provided with a common force originating in a spring 50 having its central portion extended around a roller 51 rotatably mounted on the body 10 and having its ends secured to pins 52 and 53 of the clamping elements. Wear resistant members 54 and 55 are mounted in portions of the clamping elements 15 and 16 which will engage surfaces of the article 33. A leg 56 of the clamping element 15, carrying an insert 57 of wear resistant material, extends outwardly to move in a path with the arm 11 to engage a stationary actuator 60. The actuator 60 itself is not operated but remains stationary in a fixed position where it will be engaged by the insert 57, as shown in Fig. 1, and cause movement of the clamping element 15 into its open position prior to reaching the receiving position, where the article 33 is located, and release the clamping element (Fig. 2) as the chuck comes into the receiving position to permit the elements to close on the article.

Prior to considering the operation of the chuck it should be understood that the article 33 is moved into and held temporarily in a stationary position, which is substantially the same position in the receiving area it is in when the chuck is closed thereon. Therefore, it is necessary for the article engaging parts of the chuck to move out of the way of the stationary article during opening of the chuck, to the dotted line positions (Fig. 5), and remain in these open positions until the chuck is ready to close on the article.

The operation of the chuck originates with the leg 56 particularly its insert 57, engaging the stationary actuator 60. Prior to this time the chuck is in its closed position. However, as the clamping element 15 is caused to move into open position, while engaging the actuator, there is a direct linkage between this element and the other elements by the companion engaging members 46—45 and 38—36 to cause the chuck to open. As the clamping element 15 rotates counter-clockwise about its pivot 48 the block or engaging member 46 will push against the block or engaging member 45 to cause movement of the clamping element 16. The movement of the clamping element 16 is controlled by the pins 42 and 44 and the surfaces of their apertures 40 and 41 making it necessary for the clamping element to move longitudinally in a straight line, until the pin 44 is free of the smaller portion of the aperture 41 and ready to enter the larger portion thereof, after which continued movement of the clamping element 15 will cause rocking of the clamping element 16 in an arcuate path about the pin 42. The rocking motion of the clamping element 16 will move the insert 38, Fig. 6, against the pin 36 to move the locating element 14 from its normal or closed position (solid lines Fig. 6) into its open position as illustrated in solid lines in Fig. 2, and in dotted lines in Figs. 5 and 6. This action, the opening of the chuck is necessary to move the elements away from the stationary position where the article 33 is located in the receiving area until the chuck is moved into alignment therewith in the receiving area, just prior to the stopping of the arm, at which time the leg 56 and its insert 57 will have moved beyond the actuator 60, allowing the springs 26 and 50 to function to move the elements into their closed positions where their respective surfaces of the article will be engaged to cause two reference surfaces of the article to be engaged by the surfaces 31 and 32 of the locating element 14 and to force the surfaces of the article into close engagement with the surfaces 31 and 32 by the clamping elements 54 and 55. The return arcuate motion of the clamping element 16 controls the companion engaging members 38—36 to permit the locating element 14 to move to its closed or locating position, limited by stop 21, prior to the clamping element 16, starting the latter portion of its motion. The latter portion of the motion of the clamping element 16, as the smaller portion of the aperture 41 moves about the pin 44, causes substantially straight line motion of the insert 55 against the adjacent surface of the article. The movements of the elements 16 and 14 toward their open positions are directly under the control of the element 15 through the companion engaging members 46—45 and 38—36. Furthermore, although the springs 50 and 26 supply the moving forces for the return movements of the elements to their closed positions, these movements are also under the control of the companion engaging members, aided by the apertures 40—41 and the pins 42—44 of the element 16, to control the sequence of movement of the elements into their closed positions.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A moving chuck for gripping during movement an article having different surface portions and fed to and temporarily held in a receiving area comprising a body moved in a path which extends through the receiving area, a locating element, means to hold the locating element for movement on the body between given limits, an article engaging member fixed to one end of the locating element and movable therewith between an open position away from the path when the locating element is at one limit and a locating position in the receiving area when the locating element is at the other limit, a clamping element, an article engaging member mounted thereon, means to mount the clamping element on the body for movement thereon relative to the locating element to move the article engaging member thereof between an open position away from the receiving area and a clamping position in the receiving area where the article engaging member of the clamping element is adapted to engage one surface portion of the article and firmly hold another surface portion of the article in engagement with the article engaging member of the locating element when in the locating position, means to cause movement of the elements to move their article engaging members to their open positions as the body and elements approach the receiving area, and means supported by the body and operatively connected to the elements to move the elements, when released, to move the article engaging members to their closed positions on the article as the chuck moves through the receiving area.

2. A moving chuck according to claim 1 in which a stop is supported by the body, disposed in the path of the locating element and adjustable relative thereto to vary the locating position of the article engaging member of the locating element.

3. A moving chuck according to claim 1 in which said means to cause movement of the elements includes an actuator mounted at a fixed position adjacent the path causing movement of a first one of the elements into its open position as the body and elements approach the receiving area and release said first element when the elements are in the receiving area, companion engaging members of the elements causing movement of both elements into open positions when said first one of the elements is so moved, and a power source effective to move the elements, when released, to move the article engaging members into their respective locating and clamping positions.

4. A moving chuck for gripping during movement an article having different surface portions and fed to and temporarily held in a receiving area comprising a body moved in a path which extends through the receiving area, a locating element, means to hold the locating element for movement on the body between given limits, an article engaging member with locating surfaces fixed to one end of the locating element and movable therewith between an open position away from the path when the locating element is at one limit and a locating position in the receiving area when the locating element is at the other limit, a plurality of clamping elements movably supported by the body, an article engaging member mounted on each clamping element, separate means mounted on the body for controlling movement of their respective clamping elements relative to each other and the locating element to move the article engaging members thereof between open positions away from the receiving area and individual clamping positions in the receiving area where the article engaging members of the clamping elements will engage spaced surface portions of the article and force opposing surface portions of the article against their respective locating surfaces of the article engaging member of the locating element, an actuator mounted adjacent the path to cause movement of the elements to move their article engaging members to their open positions as the body and elements approach the receiving area and to release the elements when the body is in the receiving area, and force applying means to move the elements, when released, to move the article engaging members into their respective locating and clamping positions.

5. A moving chuck according to claim 4 in which the actuator causes movement of a first one of the elements into its open position as the body and elements approach the receiving area and to release said first element when in the receiving area, pairs of companion engaging members mounted at predetermined relative positions on the elements and rendered effective, during movement of the first element into its open position, to move the other elements into their open positions, said force applying means being adapted, when said first element is released, to move the elements into the receiving area, the companion engaging members controlling the order in which the elements reach their respective positions in the receiving area.

6. A moving chuck, for gripping an article fed to and temporarily held in a receiving area, comprising a body supported for movement in a path which extends through the receiving area, a locating element, means mounted on the body to guide the locating element into open and closed positions on the body, an article engaging member mounted on one end of the element and having first and second article engaging surfaces disposed in different planes to engage and locate different surfaces of the article when in closed position in the receiving area, first and second clamping elements disposed on the body, separate means mounted on the body to support the clamping elements for movement into open and closed positions on the body to engage other surfaces of the article to hold said different surfaces of the article respectively against the first and second surfaces of the locating element when in closed positions in the receiving area, means normally forcing the elements toward their closed positions, an actuator mounted adjacent the path to cause movement of the first clamping element into its open position prior to reaching the receiving area and to release the first clamping element for movement into its closed position when in the receiving area, and companion engaging members of the first and second clamping elements and companion engaging members of the second clamping element and the locating element respectively, causing the second clamping element to be moved into open position by the first clamping element and the locating element to be moved into open position by the second clamping element.

7. A moving chuck according to claim 6 in which guides are disposed relative to each other on the second clamping element, the guides controlling movement of the second clamping element relative to its supporting means to control movements of the second clamping element to free the locating element for movement into closed position with its article engaging surfaces in the receiving area in engagement with said different surfaces of the article prior to the clamping elements reaching their closed positions.

8. A moving chuck according to claim 6 in which guides are disposed relative to each other on the second clamping element, the guides controlling movement of the second clamping element relative to its supporting means to divide both movements of the second clamping element toward its open and closed positions into a straight path and an arcuate path so that during movement into open position the guides will move the article engaging member in the straight path and then in the arcuate path, the locating element being moved into its open position during the movement in the arcuate path, the guides causing movement of the second clamping element in the arcuate path during movement toward the closed position to free the locating element to move to its closed position after which the guides control movement of the second clamping element in closed position along the straight path.

References Cited in the file of this patent
UNITED STATES PATENTS

| 2,697,307 | Diehl | Dec. 21, 1954 |
| 2,755,760 | Fermanian | July 24, 1956 |